No. 642,781. Patented Feb. 6, 1900.
T. BOYD.
BEARING FOR CYCLES.
(Application filed Mar. 20, 1897.)
(No Model.)
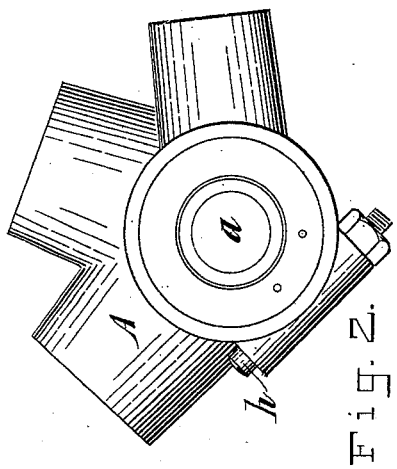
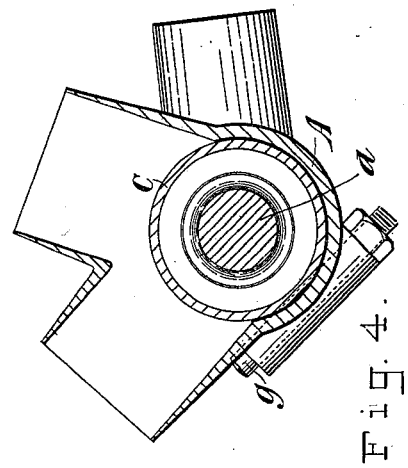
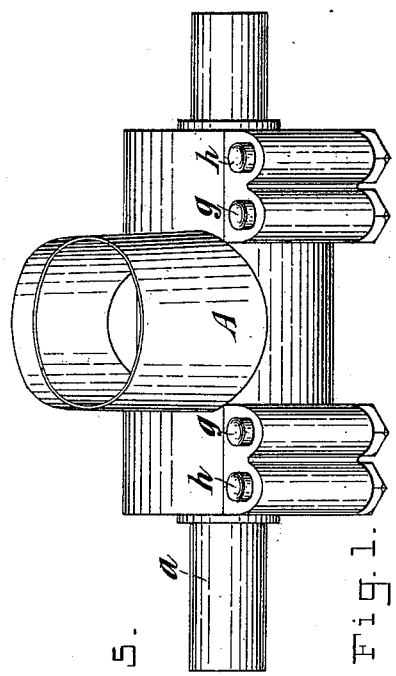
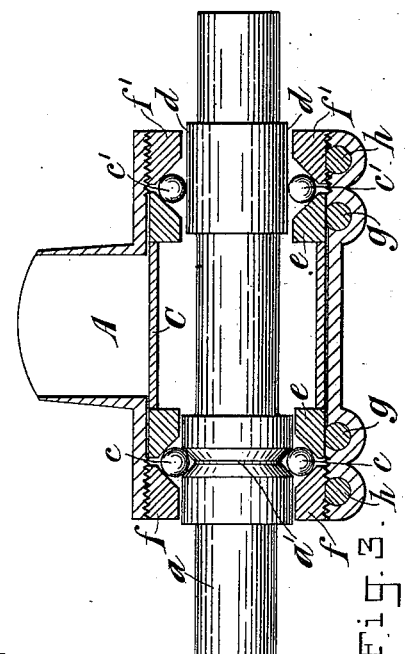
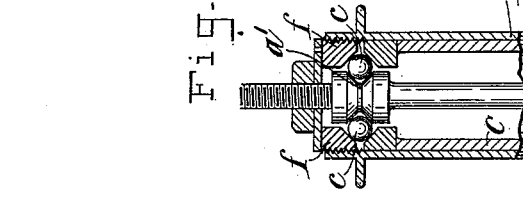
Witnesses
Inventor
Thomas Boyd

UNITED STATES PATENT OFFICE.

THOMAS BOYD, OF CHRISTCHURCH, NEW ZEALAND.

BEARING FOR CYCLES.

SPECIFICATION forming part of Letters Patent No. 642,781, dated February 6, 1900.

Application filed March 20, 1897. Serial No. 628,476. (No model.)

*To all whom it may concern:*

Be it known that I, THOMAS BOYD, a subject of the Queen of Great Britain and Ireland, and a resident of Christchurch, Canterbury, in the Colony of New Zealand, have invented certain new and useful Improvements in Bearings for Cycles, (for which I have made applications for Letters Patent in New Zealand, No. 8,910, bearing date October 3, 1896, and in Great Britain, under the International Convention, No. 96, bearing date October 3, 1896, but the patents have not yet been received,) of which the following is a specification.

The principal object of my invention is to construct the bearings so as to be adjusted from one side or both.

My improvements are applicable for both "brackets" and "hubs," but more particularly for brackets.

By the use of these improvements the bearings are more durable and accurate and also more easily adjusted.

My said improvements consist of a "sleeve," preferably of soft steel, having at each end a cone of hardened steel brazed or otherwise affixed thereon. This sleeve is inserted in the bracket or hub and the spindle fitted in same, an outer cone being screwed into said bracket or hub at each side, retaining the balls in position, the said sleeve and outer cones being held by means of cotter-pins, which tend to force the said sleeve and cones in the same direction. By screwing up either of these outer cones the said sleeve and the balls are caused to move, and thus the bearings can be adjusted on both sides at once.

Referring to the drawings, which form a part of this specification, Figure 1 is a front view of a bracket, showing the cotter-pins. Fig. 2 is a side view of same, showing one of the said cotter-pins and an outer cone. Fig. 3 is a longitudinal section of said bracket, showing the sleeve, the balls, the spindle, the outer cones, and the cotter-pins. Fig. 4 is a cross-section showing spindle, sleeve, and one cotter-pin. Fig. 5 is a view of a hub, half in section and half in elevation, having my improvements fitted therein.

The same letters of reference indicate corresponding parts wherever they occur in the several figures.

A is the bracket, and B the hub, these parts in either construction constituting the outer shell or casing of the bearing. The spindle $a$ has a longitudinally-limited bearing-surface (shown in the form of a groove $a'$ at one side) in which the balls $c$ work, a flat bearing-surface $d$ being formed at the opposite side for balls $c'$.

C is the sleeve, preferably of soft steel, to each end of which a hard-steel cone $e$ is brazed or otherwise affixed. This sleeve, and also the cones $e$, is turned and ground true before being inserted into the bracket or hub, as the case may be.

$f$ and $f'$ are outer cones which are screwed into the ends of the bracket or hub and which retain the balls in position.

$g$ $g$ are cotter-pins by means of which the said sleeve is held. $h$ $h$ are similar cotter-pins by means of which the outer cones are held when in position.

In the case of hubs the outer cones are held by lock-nuts instead of cotter-pins.

By slackening the cotter-pins on the brackets or the lock-nut on the hubs and screwing up the outer cone on one side the sleeve C, together with the balls in either case, is caused to move, and thus the bearings on both sides of the bracket or the hub, as the case may be, can be adjusted by turning one outer cone.

When it is desired to adjust the bearing without changing the alinement of wheels carried by the axle—that is, without longitudinal movement of the spindle—the cone $f'$ should be adjusted, thus, as before, adjusting the bearings on each end of the spindle.

Having now described my invention, what I claim as new, and desire to secure by Letters Patent, is—

The combination with a casing, of a spindle provided with two separated bearings one of which is grooved and the other plain, two series of balls respectively engaging said bearings, adjustable bearing-pieces engaging the outer surfaces of said balls, and a sleeve engaging the inner surfaces of said balls and free to move longitudinally with respect to the spindle and casing, substantially as described.

In witness whereof I have hereunto set my hand in presence of two witnesses.

THOMAS BOYD.

Witnesses:
A. H. HART,
GEORGE HART.